United States Patent [19]

Linseth

[11] 4,288,856
[45] Sep. 8, 1981

[54] LIVESTOCK FEEDLOT MANAGEMENT METHOD AND APPARATUS

[76] Inventor: Gerald S. Linseth, 13015 Caminito Del Rocio, Del Mar, Calif. 92014

[21] Appl. No.: 103,533

[22] Filed: Dec. 14, 1979

[51] Int. Cl.³ .................... A01K 5/00; G01G 19/04
[52] U.S. Cl. ............................ 364/567; 119/51 R; 177/25; 364/552
[58] Field of Search .................. 364/567, 568, 552; 119/51 R; 177/1, 4, 5, 25

[56] References Cited

U.S. PATENT DOCUMENTS

| | | | |
|---|---|---|---|
| 3,221,152 | 11/1965 | Jones | 364/552 |
| 3,788,278 | 1/1974 | Propst et al. | 119/51 R |
| 4,049,950 | 9/1977 | Byrne et al. | 119/51 R |
| 4,137,567 | 1/1979 | Grube | 364/567 |

*Primary Examiner*—Errol A. Krass
*Attorney, Agent, or Firm*—Frank D. Gilliam

[57] ABSTRACT

An apparatus and method for managing a livestock feedlot by early separation of poorly performing animals. Incoming animals are marked with an indentifying number, then are weighed and the number and weight are recorded. At a selected later date the animals are individually directed through a walk-through scale. As the weight is obtained, it is immediately compared to the initial weight. If weight gain is below a selected standard, an indicator light is displayed and a gate into a "cull" pen is automatically opened. If weight gain is above the standard, another indicator light is displayed and a gate into a "retain" pen is automatically opened. Some livestock, no different from others in appearance or other characteristics, do not gain weight rapidly enough to be profitably fed in a feedlot operation. The above reweighing after a short feeding period has been found to be effective in eliminating poorly performing animals. While the above method may be performed manually, greater speed, accuracy and efficiency can be obtained where the different variables are sensed and entered into a computer system which can rapidly make the necessary calculations and comparisons to separate the animals on a continuous, rapid basis.

5 Claims, 2 Drawing Figures

LIVESTOCK FEEDLOT MANAGEMENT METHOD AND APPARATUS

BACKGROUND OF THE INVENTION

This invention relates in general to feedlot operations and, more specifically, to a method and apparatus for culling poorly performing livestock from a feedlot herd before significant time and money have been expended in feeding them.

Many animals, such as cattle, if raised entirely on range grass and similar feeds do not reach an optimum heavy weight and do not produce meat of highest quality. Therefore, many such animals are raised for an initial period on ranches, then are taken to "feedlots" where they are fed an optimized high weight gain diet for a period prior to slaughter.

Since the cost of feed and the care necessary at the feedlots is high, it is necessary that weight gains be maximized to assure profitability. While most animals are brought to feedlots at weights in a fairly narrow range, the weight gains experienced by different animals varies significantly. Some gain so little that the increased value of the animal is less than the feeding cost. Therefore, the profitability of a feedlot could be greatly increased if the poorly performing livestock could be called out early in the feeding program.

Attempts have been made to cull out poor performers by appearance or other tests prior to shipping livestock to the feedlot. However, often the poorest appearing animals gain the most weight during the program and vice versa.

Sometimes the lightest appearing animals are removed at some point during the feeding program. This is not very effective since at least some of the lightest animals part way through the program were probably the lightest originally, so that their weight gain is actually n proportion to the group as a whole.

Therefore, there is a continuing need for a system for eliminating poorly performing livestock as early as possible in a feeding program.

SUMMARY OF THE INVENTION

The above problems, and others, are overcome by this invention which basically comprises a system for evaluating the weight-gain characteristics of livestock in a feedlot program at an early point in the program. Upon arrival at the feedlot, the animals are marked, such as by an ear tag, with group and individual numbers which are recorded. The animals are weighed by directing them through a narrow chute to a walk-through scale. As the first animal passes through the scale, its weight is measured, recorded and may be displayed if desired. As the first animal exits the scale, it interrupts a light beam or other sensor which actuates an entrance gate opener to admit the next animal to the scale. The animals thus move through the scale in a rapid manner. Several days later, the animals are returned to the scale and reweighed in the same manner. This time, however, the weight is compared to the initial weight, the gain-per-day is calculated and a determination is made by comparison to a pre-selected standard whether weight gain is sufficient. If not, a display is actuated showing that fact and a gate into a first or "unsatisfactory" pen is opened. If the weight gain rate is satisfactory, a second indicator is displayed and a gate into a second or "satisfactory" pen is opened. If desired, animals with weight gain rates near the standard can be directed into a third or "marginal" pen for retesting after another feeding period.

While the steps of recording identification numbers, weights, gain ratios, etc. and operation of the various gates, indicators, etc. can be done manually, if desired, it is strongly preferred that a microprocessor with appropriate sensors (e.g., manual keyboard for entering identification numbers, weight sensitive transducers on the scale, etc.) be used together with a suitable memory. With this system, animals can be directed through the scale and pen layout with automated weighing and selection, providing a rapid, high-throughput system with minimal personnel. Other preferred features and alternate arrangements will be described in the detailed description of the invention which follows.

BRIEF DESCRIPTION OF THE DRAWING

Details of the invention, and of a preferred embodiment thereof will be further understood upon reference to the drawing, wherein.

DETAILED DESCRIPTION OF THE INVENTION

Figure 1:
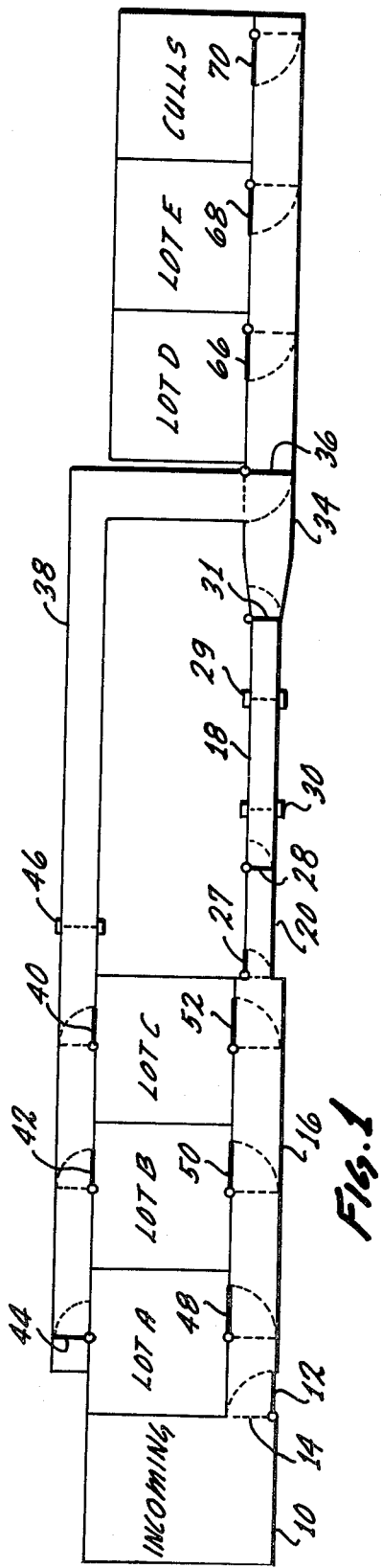
FIG. 1 is a schematic diagram of the animal handling and evaluation system of this invention.
Figure 2:
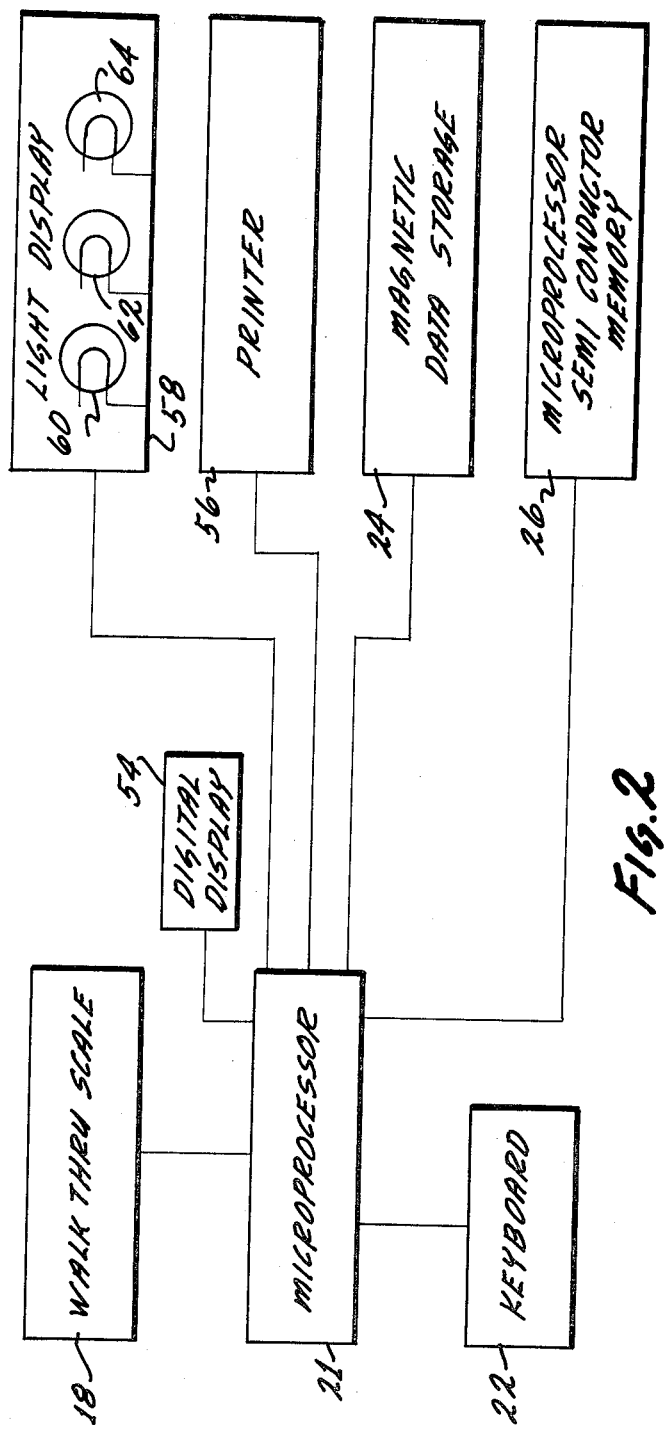
FIG. 2 is a schematic block diagram of an automatic animal weight and grading system according to this invention.

Referring now to FIG. 1, there is seen a schematic plan view of a typical facility for weighing and separating livestock undergoing the evaluation. While a manual system may be used for recording information and operating the various gates, as described below, an automated system such as is schematically represented in FIG. 2 is preferred for optimum accuracy and maximum system throughput.

As indicated in FIG. 1, arriving animals are placed in incoming pen 10. To begin the initial evaluation, gate 12 is opened as indicated by the solid lines. The opposite (in this case, closed) position of gate 12 is indicated by broken lines 14. Similarly, all other gates to be described are shown in a first position in solid lines and a second position by broken lines. As animals pass along chute 16, each will be marked with an identification number, typically on an ear tag. Typically, each identifying number may include a lot or group number and an individual number. The number is recorded, such as by entering it into microprocessor 21 through a conventional keyboard 22 (FIG. 2). This information is stored, such as in a magnetic data storage 24 or the microprocessor memory 26. Typically, three weight ranges are also keyed in, such as a low, medium and high range.

Any suitable microprocessor and memory system may be used, programmed in a conventional manner. Typical microprocessors are are available from Motorola under the MEK6802D3 designation or from Analogic under the Model 5322 designation. The system may use any conventional microprocessor memory, such as the MEK 68 MM16 from Motorola. Typically, magnetic data storage could be provided by a Type A2M0018 from Apple Computer Inc.

As the animals near the walk-through scale 18, the sides of chute 16 narrow at 20 to force the animals to proceed single file. As the first animal approaches scale 18, the operator opens gate 27 momentarily to allow each animal to enter chute section 20. The gate 28, like gate 27, may be opened momentarily to allow the first animal to enter scale 18 and may be either closed by the operator behind the animal or, preferably, the animal triggers a detector, such as a conventional photocell detector 30 having a light source on one side and a photodetector on the other, activated when the beam is broken by the animal. As the animal walks through scale 18, its weight is measured and recorded in the memory of microprocessor 21. Alternatively, the weight could be displayed digitally and recorded manually. Any suitable walk-through scale may be used. A typical scale useful for a variety of types of livestock consists of four 1000 lb. load cells, available from Baldwin and an analog-to-digital converter, available from Motorola under the M68MM05A designation.

As the animal leaves the scale, it intercepts the beam of another photoelectric detector 29 (or other suitable detector) which causes gate 28 to open, admitting the next animal and gate 31 to open allowing the weighed animal to exit the scale. Gate 31, like gate 28, may be closed manually or by photocell detector 30. As the first animal continues through outlet chute 34, gate 36 is open as indicated, directing the animal into chute 38. Chute 38 directs the animal to one or more feed lots to begin the feeding operation.

In some cases, a single feed lot will be used. However, it is often desirable to divide the incoming animals into groups by incoming weight range since lighter animals may be fed and processed somewhat differently than larger animals. While any suitable number of feed lots may be used, three lots are illustrated. Three weight ranges are selected and entered into microprocessors 21 through keyboard 22. Then, microprocessor 21 in a conventional manner using conventional actuators, causes gate 40 to open if scale 18 indicates an animal in the lightest range, gate 42 to open for mid-range animals and gate 44 to open for heaviest animals. In the example shown, gates 40 and 42 are closed and gate 44 is open to receive the first animal.

The weight may be displayed on a digital display 54 (FIG. 2) and the individual identification numbers, lot numbers and weights may be printed by a conventional printer 56. Also, a light display 58 may be used to give an immediate indication of animal condition to observers. For example, a red light 60 may indicate the lightest weight range, a yellow light 62 the medium weight range and a green light 64 the heaviest weight range. Any suitable digital display and printer may be used. A typical digital display means if available from the Info-Lite Corp. under the Series 0D68033 designation, providing 3-inch letters. A typical printer is available from the Centronics Corp. under the Model PI designation.

In practice, the entrances to Lots A, B and C may be quite close to the exit of scale 18, so animals move quickly from scale to lot. However, if a chute 38 of considerable length, such as that schematically illustrated, is used, several animals may be in transit at one time, spaced apart, in chute 38. Microprocessor 21 is, of course, capable of "remembering" the proper lots for each of such a train of animals. Thus, as each animal reaches the end of chute 38, a detector 46 is triggered indicating that an animal has reached that point, thereby causing microprocessor 21 to open and close the appropriate ones of gates 40, 42 and 44.

Once all of the animals have reached feed lots A, B and C, the normal feeding process is begun and continued for a selected number of days. The evaluation procedure is then begun. Gates 14 and 36 are closed, one of outlet gates 48, 50 and 52 is opened and the animals directed into chute 16. Again, the animals are directed through scale 18 in seratim. The lot number, individual number, days on feed and the "minimum acceptable" and "marginal range" weights are entered through keyboard 22 or are manually recorded. Then, as each animal passes through scale 18, the measured weight passes to microprocessor 21, which compares the new weight to the incoming weight for each animal and calculates the average daily weight gain in a conventinal manner. Typically, a digital display 54 (FIG. 2) may display the identification number, weight, average weight gain, percentage of body weight, etc. This information may also be printed by printer 56 for a permanent record. In this case, light display 58 might indicate unacceptable weight gain by a red light 60, marginal weight gain by a yellow light 62 and fully acceptable weight gain by a green light 64. If manually operated gates are used, they may be actuated by workers in accordance with the lights displayed.

Microprocessor 21, through conventional actuators (or manually by the operators, if desired) opens the appropriate gate to receive the re-evaluated animals. For example, gate 66 may be opened to direct the fully acceptable animals into Lot D, or gate 68 may be opened to admit marginal animals into Lot E or gate 70 may be opened to admit unacceptable animals into the "cull" lot.

After the re-evaluation, the culls are disposed of and the feeding program is continued to completion with the fully acceptable animals. The marginal animals can be again sent through the evaluation process in the manner described above and again divided into groups according to performance.

The information stored in the microprocessor memory (or corresponding manual records) may be used for other purposes, such as determining the relative average quality of shipments of animals from different sources, the relative effectiveness of different feeding programs, as desired.

This system is very economical of labor, since at most one operator to begin operation of the system, tag the animals and operate keyboard 22 and a few unskilled workers to keep the animals moving in the chutes are all that is required. Using the microprocessor system, no record keeping or calculations are required of the operator.

In a typical setting, where cattle are being fed, the necessary data for the producer to cull out poorly performing animals can be obtained after typically 30 to 60 days of a normal 300 day feeding period for 400 lb. calves. The initial sorting may be into a light 300 to 350 lb. group, a medium 350 to 400 lb. group and a heavy 400 to 450 lb. group. The break-even point for weight gain may be 2 lb./day. Thus, those animals with an average daily weight gain of less than 2 lb./day will be disposed of very early in the feeding program, those with 2-3 lb./day average weight gain can be re-evaluated and those with over 3 lb./day average weight gain will be processed through the entire cycle.

Other variations, applications and ramifications of this invention will occur to those skilled in the art upon reading this specification. These are intended to be included within the scope of this invention, as defined in the appended claims.

I claim:

1. A method of culling animals having poor weight gain characteristics from a feed lot herd which comprises:

providing each animal with an identifying number;

entering the identifying number into a memory system;

directing each animal individually through a walk-through scale;

displaying a first weight for observation the weight of each animal as indicated by said scale;

indicating which of a plurality of selected weight ranges the indicated first weight of each animall falls within;

entering the indicated first weight of each animal in said memory system;

actuating a detector as the animal leaves the scale to automatically open the scale entrance for the next animal;

directing animals from said scale to at least one feeding pen;

after a selected number of days, again directing said animal through the weighing system to obtain a second weight of each animal;

entering the second weight in said memory system;

comparing the first and second weights for each animal and the time period between weighings to determine the average daily weight gain for each animal;

determining relative to a selected standard which animals have accomplished a satisfactory weight gain; and actuating appropriate ones of a plurality of gates at the outlet of said scale to direct animals having different weight gain characteristics to different pens;

whereby animals having unsatisfactory weight gain characteristics are separated from the balance of the herd.

2. The method according to claim 1 including the further steps of repeating said second weighing and separation after a further number of days with animals to further separate them into groups according to weight gain characteristics.

3. Apparatus for separating feedlot animals into groups in accordance with weight gain characteristics which comprises;

a walk-through scale for determining the initial weight of each animal;

chute and gate means for directing said animals from said scale to at least one feeding pen;

chute and gate means for directing said animals from said at least one feeding pen to said scale at a date later than the date of the initial weighing to obtain a later weight;

means for entering identifying numbers assigned to each animal and said initial and later weights into a memory system at the time of each respective weighing and for entering into said memory system the time period between said initial and said later weighings and criteria as to acceptable average daily weight gain characteristics;

means for calculating average daily weight gains for each animal and comparing them to said criteria; and means for directing each animal leaving said scale after said later weighing to one of a plurality of pens in accordance with the degree to which said weight gain criteria are met;

whereby animals failing to meet said criteria can be separated from feedlot herd at an early point in the feeding period.

4. A method of grouping animals according to weight gain characteristics and of culling animals having poor weight gain characteristics from a feed lot herd which comprises:

providing an identifying number for each of said animals;

entering the identifying numbers into a memory system;

guiding each animal individually through a walk-through scale to determine the initial weight of each animal;

entering the initial weight of each animal into the memory system;

displaying the initial weight of each animal while in the scale for observation;

indicating whether the initial weight of each animal is in a selected mid-range of weights or is above or below that range;

actuating a detector as each animal leaves the scale to automatically open the scale entrance for the next animal;

guiding each animal to one of a first, second and third feeding pen according to weights above, within or below said mid-range respectively;

after feeding said animals for a selected number of days which constitute a portion of a normal feeding period for such animals, guiding said animals from said first, second and third feeding pens through said scale to obtain a second weight for each animal;

entering the identifying number and the second weight for each animal into said memory system;

comparing the initial and second weights for each animal in relation to the time period between respective weighings to determine the average daily weight gain for each animal;

comparing the average daily weight gain for each animal to a selected minimum acceptable daily weight gain;

opening and closing appropriate ones of a plurality of gates along at least one chute extending away from the outlet of said scale to guide animals having an average daily weight gain below the minimum acceptable daily weight gain to a cull pen and to guide other animals to at least one feeding pen for continuation of the feeding period.

5. The method according to claim 4, wherein after the second weighing, the animals having acceptable average daily gains are grouped into related ranges according to the extent to which the minimum is exceeded and said gates are operated to guide the animals in each selected range to one of a plurality of feeding pens.

* * * * *